S. A. WILTSIE.
TOASTER.
APPLICATION FILED JAN. 22, 1912.

1,105,230.

Patented July 28, 1914.

Witnesses
B. M. Hartman
J. J. Schwartz

Inventor
Seneca A. Wiltsie
by W. Z. Roof.
Attorney

UNITED STATES PATENT OFFICE.

SPENCER A. WILTSIE, OF ERIE, PENNSYLVANIA, ASSIGNOR, BY MESNE ASSIGNMENTS, TO COPEMAN ELECTRIC STOVE COMPANY, OF FLINT, MICHIGAN, A CORPORATION OF MICHIGAN.

TOASTER.

1,105,230.  Specification of Letters Patent.  Patented July 28, 1914.

Application filed January 22, 1912. Serial No. 672,533.

*To all whom it may concern:*

Be it known that I, SPENCER A. WILTSIE, a citizen of the United States, residing at Erie, county of Erie, and State of Pennsylvania, have invented new and useful Improvements in Toasters, of which the following is a specification.

This invention relates to toasters and consists in certain improvements in the construction thereof as will be hereinafter fully described and pointed out in the claims.

The toaster is particularly designed as an electric toaster and while in its broadest features it is applicable to other heat producing elements, it is exemplified as an electric toaster.

The invention is illustrated in the accompanying drawings as follows:—

Figure 1:
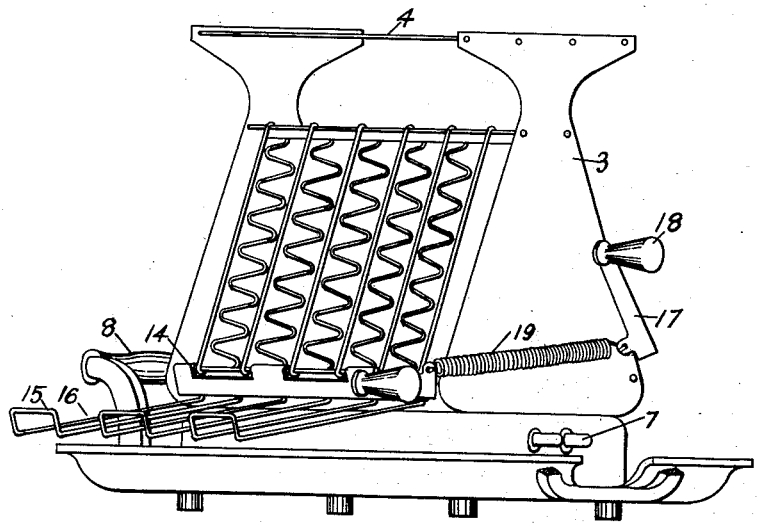
Figure 2:
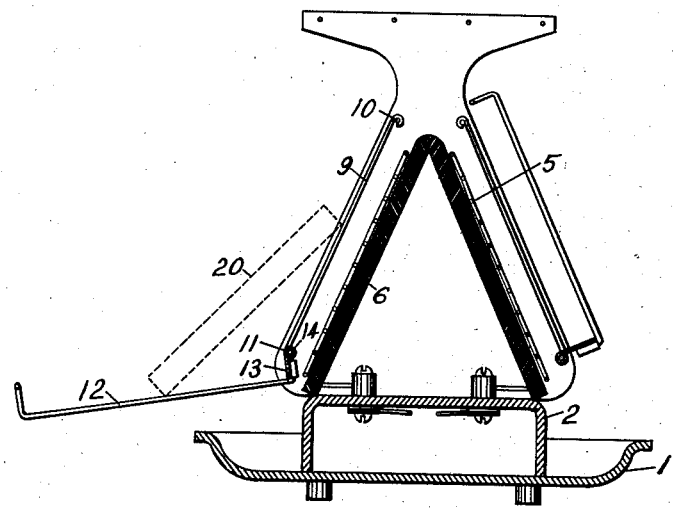

Figure 1 shows a perspective view in elevation of the toaster. Fig. 2 a cross section of the toaster.

The toaster is mounted on a tray 1, the base 2 being attached to this tray. The end pieces 3 extend upwardly from the base and these are connected by the wires 4 at the top, the wires 4 forming a support on which toasted material may be placed for keeping hot.

The electrical heating elements are arranged adjacent to the backings or reflecting surfaces 6. The heating elements are united with the terminals 7, the terminals being in such relation to the handle 8 as to readily permit of the attachment of the connection. It will be observed that the reflecting surfaces or backings for the heating unit are inclined and form a closure at the top. This prevents an upward circulation of air back of the reflectors or heat producing backings and thus adds to the efficiency of the device. Supporting grids adjacent to the heat producing elements are formed by the wires 9, these wires 9 extending from the cross wire 10 at the top to a cross wire 11 extending across the bottom.

A reversing carrier, cover or pressure grid 12 is formed of wires which are secured to a hinge plate 13, the hinge plate having the bent hinge portions 14 which extend around the wire 11 forming the hinge for the carrier or cover 12. The hinge plate also forms a shoulder at the inner end of the carrier or cover, and the wires forming this carrier are bent up as at 15 at their outer ends forming a shoulder against which the bread being toasted abuts as it is reversed.

The bread is placed on the carrier 12 while in a horizontal position and the carrier is then swung up so as to carry the bread on to the grid formed by the wires 9. When the first side of the bread has been toasted, the carrier 12 is dropped down to the horizontal position. This drops the shoulder 13 from below the edge of the bread and the bread slides with its lower edge along the carrier 12 so as to drop on to the carrier with the toasted side down. Fig. 2 shows the bread midway in its reversing movement. After the bread reaches the position with the toasted side down, all that is necessary to do is to swing the carrier up again to the upper position. This carries with it the bread and brings the fresh side next to the grid formed by the wires 9. In this way the surfaces of the bread are automatically reversed.

It is desirable to have the shoulder formed by the bent up portions 15 in order to prevent the sliding off of the bread as it slides down on the carrier. This shoulder prevents the removal of the bread by slipping it off the edge of the carrier. I prefer, therefore, to have the carrier 12 formed of wires extending in pairs with the bent up ends of the pairs at 15 united. This leaves the spaces 16 between the pairs open so that the operator may grasp the bread or toast in these spaces, thus readily removing it.

The hinge plate 13 is in the form of sheet metal, and the extension of the plate is bent up forming a crank 17. This crank is provided with the handle 18 by means of which the carrier 12 may be readily swung in the reversing operation. These carriers 12 are at opposite sides of the toaster and the spring 19 extends from one crank 17 to the opposing crank 17, the single spring, therefore, answering for both carriers. The spring is so located, as clearly shown in Fig. 1, that when the carrier is turned down, the line of the spring is below the axis of the hinge of the carrier and the spring, therefore, yieldingly holds the carrier to remain in its lower position. At the same time, as the carrier is started in its upper movement, the spring is carried past the axis of the hinge and from there on lifts the carrier to position. The spring should be of sufficient strength to exert pressure on the carrier or cover so that the warping of the bread as it is toasted is prevented.

I prefer to make the cover or carrier in the form of a grid because where this is done the currents of heated air passing upwardly from the heat unit find an outlet to some extent through the bread itself and thus more thoroughly toasts the bread than is the case where an imperfect cover is used. In order to effect by gravity the reversing of the material being toasted the grid in its lower position should have its outer edge slightly below its inner edge as shown.

What I claim as new is:—

1. In a toaster, the combination of a heat producing element; and means for supporting the material to be toasted adjacent to the element comprising a swinging and reversing carrier moving toward and from the same face of the element as it is swung and automatically reversing the material being toasted with said movement.

2. In a toaster, the combination of an upwardly extending heat producing element; and means for supporting the material to be toasted adjacent to the element comprising a swinging reversing carrier moving from and toward the same face of the element to substantially horizontal position when open to permit the sliding of the material to be toasted when open for reversing the face of said material on the carrier.

3. In a toaster, the combination of an upwardly extending heat producing element; and means for supporting the material to be toasted adjacent to the element comprising a swinging reversing carrier moving from and toward the same face of the element to substantially horizontal position when open to permit the sliding of the material to be toasted when open for reversing the face of said material on the carrier, said carrier having a shoulder at its outer edge.

4. In a toaster, the combination of an upwardly extending heat producing element; and means for supporting the material to be toasted adjacent to the element comprising a swinging reversing carrier moving from and toward the same face of the element to substantially horizontal position when open, to permit the sliding of the material to be toasted when open for reversing the face of said material on the carrier, said carrier having a shoulder at its inner and outer edge, the shoulder at the inner edge supporting the material with the carrier in its upper or closed position.

5. In a toaster, the combination of two heat producing elements on opposite faces; means for supporting material to be toasted adjacent to said faces; covers swingingly mounted adjacent to said means and swinging toward and from said means; and a spring extending from one cover to the other and positioned and directioned to be carried to the axis of the hinge with the opening movement of the cover to neutralize the action of the spring on the open cover.

6. In a toaster, the combination of a heat producing element; means for supporting material to be toasted adjacent to the element; a swinging grid arranged to operate on the material being toasted, said grid being adapted to be swung to approximately horizontal position and having openings extending from its edge inwardly through which the material on the cover may be grasped, said cover having a shoulder at its outer edge.

7. In a toaster, the combination of a heat producing element arranged on an incline; means for supporting the material to be toasted adjacent to the heat producing element; and devices for exerting pressure on the surface of the material being toasted, said devices being in the form of a grid.

8. In a toaster, the combination of heat producing elements arranged on inclined and opposing faces, the tops of the elements being adjacent to each other; backings for the heat producing element forming a V in cross section and forming a closure at the top; and means for supporting the material to be toasted adjacent to said heat producing elements.

In testimony whereof I have hereunto set my hand in the presence of two subscribing witnesses.

SPENCER A. WILTSIE.

Witnesses:
THOMAS C. MILLER,
B. M. HARTMAN.